United States Patent [19]

Komai et al.

[11] Patent Number: 5,613,691
[45] Date of Patent: Mar. 25, 1997

[54] SEALING DEVICE FOR UNIVERSAL JOINT WITH INTEGRAL SEALING LIPS AND COVER PORTION

[75] Inventors: Hiromichi Komai; Hidenori Haraguchi, both of Atsugi, Japan

[73] Assignee: Unisia Jecs Corporation, Atsugi, Japan

[21] Appl. No.: 673,467

[22] Filed: Jul. 1, 1996

Related U.S. Application Data

[63] Continuation of Ser. No. 376,738, Jan. 23, 1995, abandoned.

[30] Foreign Application Priority Data

Feb. 4, 1994 [JP] Japan .................................. 6-012497

[51] Int. Cl.$^6$ .............................. F16C 1/24; F16D 3/40; F16J 15/32
[52] U.S. Cl. .................. 277/152; 384/486; 464/131
[58] Field of Search ............................ 277/38, 95, 152, 277/153; 384/484, 486; 464/128, 131

[56] References Cited

U.S. PATENT DOCUMENTS

| | | |
|---|---|---|
| 2,773,366 | 12/1956 | Slaght . |
| 3,218,692 | 11/1965 | Kayser .................................. 464/131 |
| 3,457,732 | 7/1969 | Decouzon ............................ 464/131 |
| 3,581,524 | 6/1971 | Pitner .................................... 464/131 |
| 3,588,129 | 6/1971 | Pitner . |
| 3,788,100 | 1/1974 | Pitner .................................... 464/131 |
| 3,799,039 | 12/1973 | Sculttenkamper ................... 464/131 |
| 4,576,382 | 3/1986 | Scharting et al. ...................... 277/152 |
| 4,710,150 | 12/1987 | Mangiavacchi ...................... 277/152 |
| 4,903,971 | 2/1990 | Bauer ................................... 277/152 |
| 5,314,380 | 5/1994 | Yamamoto ............................ 464/128 |

FOREIGN PATENT DOCUMENTS

| | | |
|---|---|---|
| 1893765 | 5/1964 | Germany . |
| 6941803 | 10/1969 | Germany . |
| 3517959 | 12/1985 | Germany . |
| 48-79954 | 12/1971 | Japan . |
| 61-23528 | 2/1986 | Japan . |
| 166296 | 2/1959 | Sweden ................................ 464/131 |

*Primary Examiner*—Scott Cummings
*Attorney, Agent, or Firm*—Foley & Lardner

[57] ABSTRACT

A sealing device for an universal joint includes a lip portion arranged to be in close contact with an outer peripheral edge of a bearing cap, and a dust cover portion arranged at the outer periphery of the lip portion substantially in parallel thereto with a predetermined clearance so as to extend over the outer peripheral edge of the bearing cap.

11 Claims, 2 Drawing Sheets

5,613,691

SEALING DEVICE FOR UNIVERSAL JOINT WITH INTEGRAL SEALING LIPS AND COVER PORTION

This application is a continuation of application Ser. No. 08/376,738, filed Jan. 23, 1995, now abandoned.

BACKGROUND OF THE INVENTION

The present invention relates to a sealing device for an universal joint and more particularly, to the sealing device for an universal joint for a propeller shaft used in a power transmission system of a motor vehicle.

A conventional sealing device for an universal joint is disclosed, for example, in JP 48-79954 or JP-U 61-23528. Such sealing device includes a resilient ring of rubber installed between a bearing cap arranged to a joint cross of the universal joint and a base of the universal joint, and having inner and outer lip portions which are in close contact with an end face of the bearing cap and a ridgeline portion between the end face of the bearing and a side surface thereof, respectively, thus sealing in lubricant around needle bearings, and releasing through the lip portions internal pressure produced in the bearing cap.

According to the above conventional sealing device for an universal joint, the inner and outer lip portions, namely, the dust lip portion positioned outside to be in close contact with the ridgeline portion between the end face of the bearing cap and the side surface thereof, and the oil lip portion positioned inside to be in close contact with the end face of the bearing cap, serve to seal the bearing cap. However, during electrodeposition painting taken place in the manufacturing process of the propeller shaft, a paint sticks on an outer peripheral surface of the dust lip portion as positioned outside, and solidifies with the drying, resulting in degradation of the resilient function. That is, part of the dust lip portion which is in close contact with the bearing cap loses resilient behavior, and falls in the hard contact state, accelerating wear and producing a reduction in the sealing function.

It is, therefore, an object of the present invention to provide a sealing device for an universal joint which contributes to prolongation of the longevity without any reduction in the sealing function.

SUMMARY OF THE INVENTION

According to one aspect of the present invention, there is provided a sealing device for an universal joint, the sealing device being installed between a bearing cap arranged to a joint cross of the universal joint and a base of the universal joint, the sealing device comprising:

a lip portion arranged to be in close contact with an outer peripheral edge of the bearing cap; and a cover portion arranged at an outer periphery of said lip portion substantially in parallel thereto with a predetermined clearance, said cover portion extending over said outer peripheral edge of the bearing cap.

According to another aspect of the present invention, there is provided a sealing device for an universal joint, the sealing device being installed between a bearing cap arranged to a joint cross of the universal joint and a base of the universal joint, the sealing device comprising:

a first lip portion arranged to be in close contact with an end of the bearing cap;

a second lip portion arranged to be in close contact with an outer peripheral edge of the bearing cap; and a cover portion arranged at an outer periphery of said second lip portion substantially in parallel thereto with a predetermined clearance, said cover portion extending over said outer peripheral edge of the bearing cap.

DETAILED DESCRIPTION OF THE INVENTION

Figure 1:
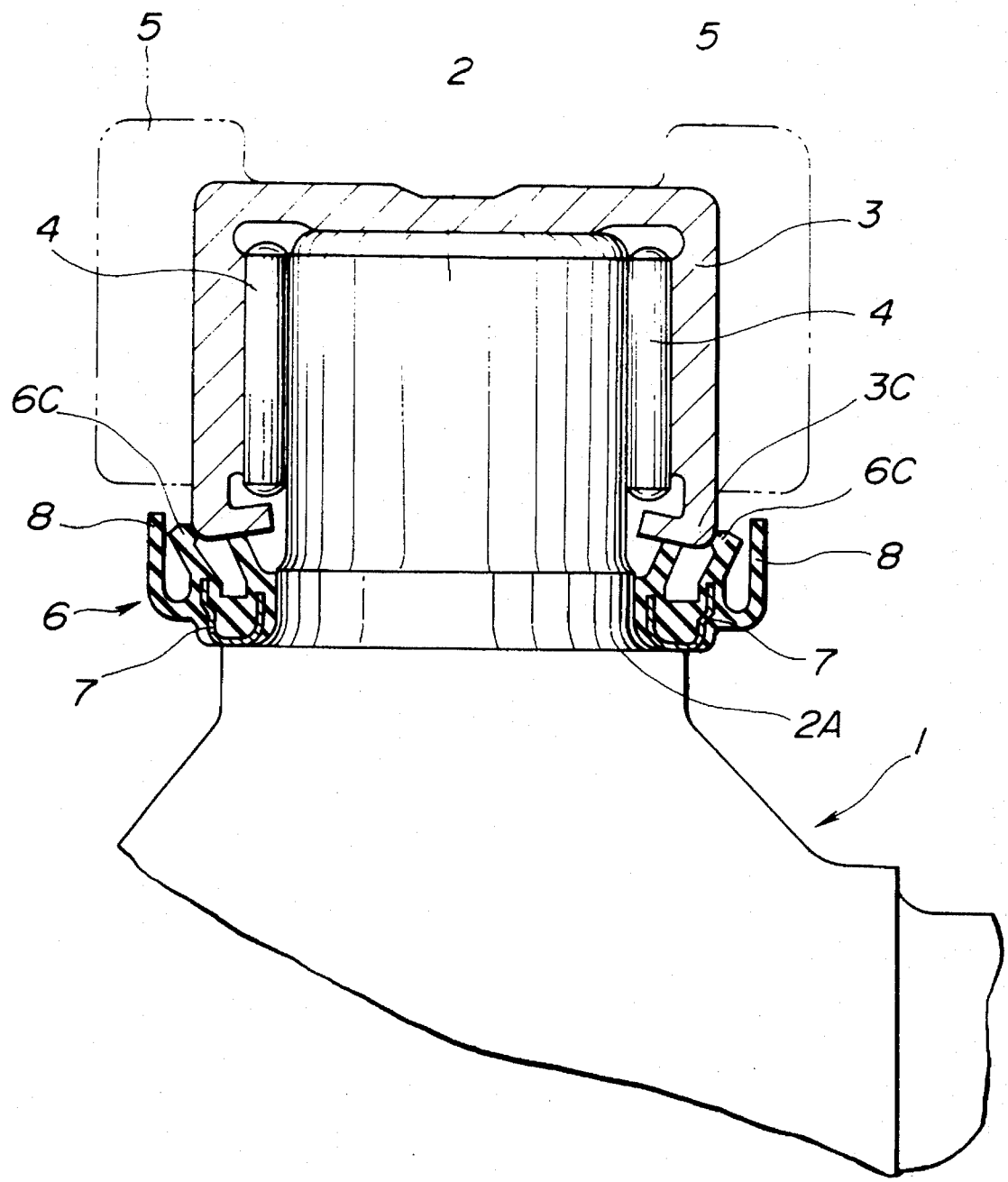
FIG. 1 is a sectional view showing a preferred embodiment of a sealing device for an universal joint according to the present invention.

Referring to the drawings, a preferred embodiment of the present invention will be described.

Referring to FIG. 1, a sealing device according to the present invention is shown with a joint cross of an universal joint. As shown in FIG. 1, a joint cross 1 includes a bearing portion 2, and a bearing cap 3 is arranged to hold a plurality of needle bearings 4 around the bearing portion 2. Reference numeral 5 designates a yoke on the side of input and output shafts, and 6 designates a sealing device or member according to the present invention, which is made of resilient material such as rubber or the like.

Figure 2A:
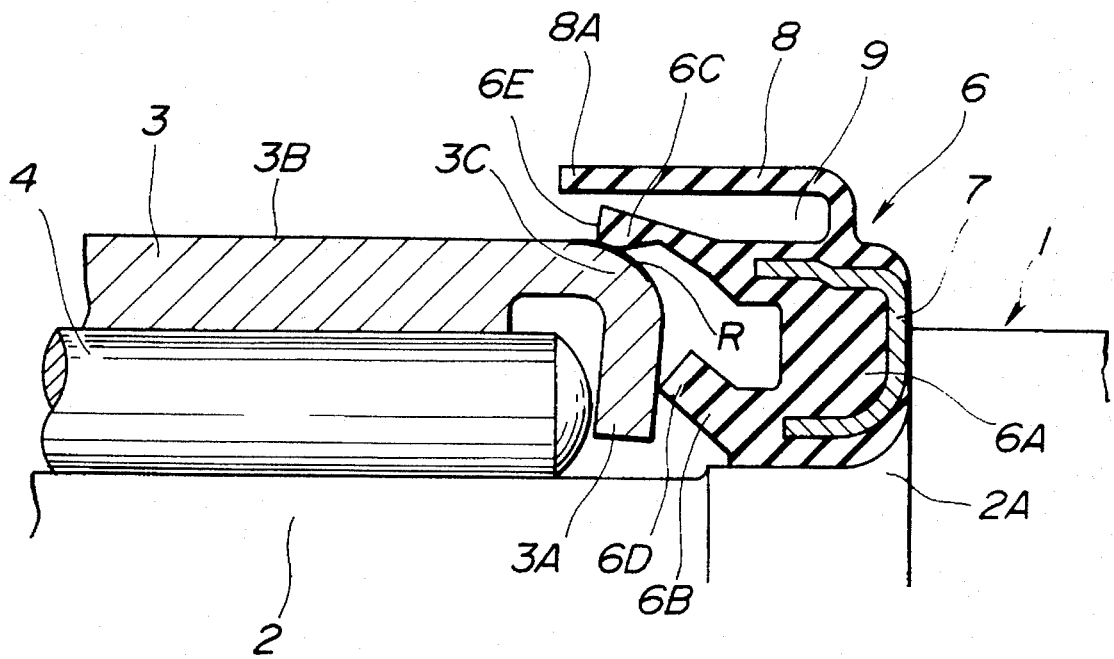
FIG. 2A is an enlarged sectional view showing the sealing device in the installed state.
Figure 2B:
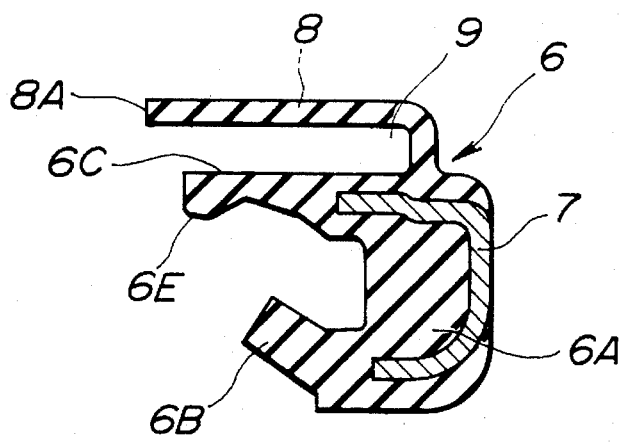
FIG. 2B is a view similar to FIG. 2A, showing the sealing device in the non-installed state.

Referring to FIGS. 2A and 2B, the sealing member 6 will be described in detail.

A reinforcing ring 7 is buried in the sealing member 6 of resilient material so as to maintain the shape of the sealing member 6. The reinforcing ring 7 is made of metal, etc., and has a substantially C-shaped section. A sealing portion 6A of the sealing member 6 is arranged to be in close contact with a base 2A of the bearing portion 2 in the circumferential direction thereof. An oil lip portion 6B is arranged to be inclined obliquely upwardly from the inside of the sealing portion 6A, whereas a dust lip portion 6C is arranged to extend in the direction of an outer peripheral surface of the bearing cap 3 from the outside of the sealing portion 6A. A dust cover portion 8 is arranged outside the dust lip portion 6C and with a space 9 with respect thereto so as to extend in the direction of the outer peripheral surface of the bearing cap 3 from the sealing portion 6A. A pointed end 8A of the dust cover portion 8 is arranged to extend over a pointed end 6E of the dust lip portion 6C, so that the dust lip portion 6C, particularly, the pointed end 6E thereof which is in close contact with the bearing cap 3 can be prevented from being directly exposed outside in the installed state of the sealing member 6 as shown in FIG. 2A.

In such a way, referring to FIG. 2A, with the sealing member 6 having the sealing portion 6A closely installed at the base 2A of the bearing portion 2, an end 6D of the oil lip portion 6B is in close contact with an outside surface of an end 3A bent inwardly of the bearing cap 3 which functions as a bearing race. Further, the dust lip portion 6C is in close contact with a ridgeline portion 3C formed between the end 3A of the bearing cap 3 and a side surface 3B thereof with a shape R, and the dust cover portion 8 functions to cover the dust lip portion 6C and the end 6E thereof, so that when painting the joint cross 1, etc. by electrodeposition painting and the like, a paint fails to stick on the dust lip portion 6C which is not exposed outside. Furthermore, when being in close contact with the ridgeline portloft 3C of the bearing cap 3, the dust lip portion 6C is deformed slightly outwardly as shown in FIG. 2A, which fails to affect the dust cover portion 8, however, due to the space 9 arranged between the dust lip portion 6C and the dust cover portion 8.

Thus, the dust lip portion 6C can be prevented from hardening and losing resilient behavior due to sticking of a paint. Further, the oil lip portion 6B serves to prevent leakage of grease in the bearing cap 3, whereas the dust lip portion 6C functions resiliently to release air when internal pressure within the bearing cap 3 is increased. Furthermore, resilient behavior of the dust lip portion 6C is protected by the dust cover portion 8, enabling maintaining of the function of preventing invasion of dust during a long period of time. Still further, part of the dust lip portion 6C which is in close contact with the ridgeline portion 3C can be prevented from wearing due to hardening, enabling prolongation of the longevity of the sealing portion 6A.

In the embodiment as described above, the dust cover portion is arranged outside the dust lip portion of the two annular lip portions arranged to the sealing portion, and integrally formed therewith. However, the shape of the annular lip portions is not limited to that one as shown in the embodiment, and the present invention is widely applicable to the sealing devices for an universal joint having the dust lip portion in the sealing portion.

What is claimed is:

1. A sealing device for an universal joint, the sealing device being installed between a bearing cap arranged on a bearing portion of a joint cross of the universal joint and a base of the universal joint, the sealing device comprising:

an outer peripheral portion;

a lip portion arranged at said outer peripheral portion, said lip portion being in close contact with an outer peripheral edge of the bearing; and a cover portion arranged at an outer periphery of said lip portion substantially parallel therewith an at a predetermined clearance, said cover portion extending over said outer peripheral edge of the bearing cap without contacting said outer peripheral edge thereof, said lip portion and said cover portion being integrally formed with each other.

2. A sealing device as claimed in claim 1, wherein said lip portion and cover portion are made of resilient material.

3. A sealing device for an universal joint, the sealing device being installed between a bearing cap arranged on a bearing portion of a joint cross of the universal joint and a base of the universal joint, the sealing device comprising:

an outer peripheral portion;

a first lip portion arranged to be in close contact with an end of the bearing cap;

a second lip portion arranged at the outer peripheral portion, said second lip porkion being in close contact with an outer peripheral edge of the bearing cap; and a cover portion arranged at an outer periphery of said second lip portion, substantially parallel therewith and at a predetermined clearance, said cover portion extending over said outer peripheral edge of the bearing cap, said first lid portion, said second lip portion and said cover portion being integrally formed with each other.

4. A sealing device as claimed in claim 3, wherein said first lip portion, second lip portion and cover portion are made of resilient material.

5. A sealing device for an universal joint, the sealing device being installed between a bearing cap and a base of the universal joint, said bearing cap being arranged on a bearing portion of a joint cross of the universal joint, the sealing device comprising:

an outer peripheral portion;

a lip portion arranged at said outer peripheral portion, said lip being in close contact with an outer peripheral edge of the bearing cap; and a cover portion disposed in spaced parallel arrangement about an outer periphery of said lip portion, said cover portion extending over said outer peripheral edge of the bearing cap without contacting said outer peripheral edge thereof, and said lip portion and said cover portion being integrally formed of resilient material.

6. A sealing device for an universal joint, the sealing device being installed between a bearing cap and a base of the universal joint, said bearing cap being arranged on a bearing portion of a joint cross of the universal joint, the sealing device comprising:

an outer peripheral portion;

a first lip portion arranged to be in close contact with an end of the bearing cap;

a second lip portion arranged at the outer peripheral portion, said second lip portion being in close contact with an outer peripheral edge of the bearing cap; and a cover portion disposed in spaced parallel arrangement about an outer periphery of said second lip portion, said cover portion extending over said outer peripheral edge of the bearing cap, and said first lip portion, said second lip portion and said cover portion being integrally formed of resilient material.

7. A sealing device of claim 5, further comprising a reinforcing ring which is disposed within the sealing device, said sealing device having a configuration and said reinforcing ring being substantially C-shaped and further being adapted to maintain the sealing device in said configuration.

8. A sealing device of claim 6, further comprising a reinforcing ring which is disposed within the sealing device, said sealing device having a configuration and said reinforcing ring being substantially C-shaped and further being adapted to maintain the sealing device in said configuration.

9. A sealing device of claim 6, wherein a portion of said cover portion extends over a portion of said second lip portion such that said cover portion covers substantially the entire second lip portion, thereby preventing the second lip portion from being exposed.

10. A sealing device of claim 6, wherein there is a space provided between said cover portion and said second lip portion such that when the sealing device is installed between the bearing cap and the base of the universal joint, at least a portion of said second lip portion is deformed outwardly into said space.

11. A sealing device of claim 10, wherein said cover portion is not deformed outwardly when the sealing device is installed between the bearing cap and the base of the universal joint.

* * * * *